(12) United States Patent
Chou

(10) Patent No.: US 9,342,772 B2
(45) Date of Patent: May 17, 2016

(54) SUBSTRATE STRUCTURE AND METHOD OF MANUFACTURING THE SAME

(71) Applicant: PHOENIX PIONEER TECHNOLOGY CO., LTD., Hukou Township (TW)

(72) Inventor: Pao-Hung Chou, Hukou Township (TW)

(73) Assignee: Phoenix Pioneer Technology Co., Ltd., Hukou Township, Hsinchu County (TW)

( * ) Notice: Subject to any disclaimer, the term of this patent is extended or adjusted under 35 U.S.C. 154(b) by 0 days.

(21) Appl. No.: 14/515,003

(22) Filed: Oct. 15, 2014

(65) Prior Publication Data

US 2016/0055403 A1    Feb. 25, 2016

(30) Foreign Application Priority Data

Aug. 20, 2014  (TW) .............................. 103128584 A

(51) Int. Cl.
*G06K 19/06* (2006.01)
*G06K 1/12* (2006.01)

(52) U.S. Cl.
CPC ............ *G06K 19/06037* (2013.01); *G06K 1/12* (2013.01); *G06K 19/0614* (2013.01)

(58) Field of Classification Search
CPC ................... G06K 19/06037; G06K 19/0614; G06K 1/12
See application file for complete search history.

(56) References Cited

U.S. PATENT DOCUMENTS

2011/0026232 A1* 2/2011 Lin ................... H01L 21/76898
361/760

FOREIGN PATENT DOCUMENTS

CN          102375331 A  *  3/2012

OTHER PUBLICATIONS

For the English translation of CN 102375331 A see the following site: https://patents.google.com/patent/CN102375331A/en03-2012.*

* cited by examiner

*Primary Examiner* — Kristy A Haupt
(74) *Attorney, Agent, or Firm* — Steptoe & Johnson LLP

(57) ABSTRACT

A method of manufacturing a substrate structure is disclosed, including: providing a carrier board having a first surface; and forming a circuit layer and metallic lines on the first surface. The metallic lines and the carrier board constitute a two dimensional code, thereby eliminating the need to form 2D codes by laser or inkjet after the substrate structure is manufactured. Therefore, the method is simplified, and the substrate structure has a reduced cost. The present invention further provides the substrate structure.

9 Claims, 5 Drawing Sheets

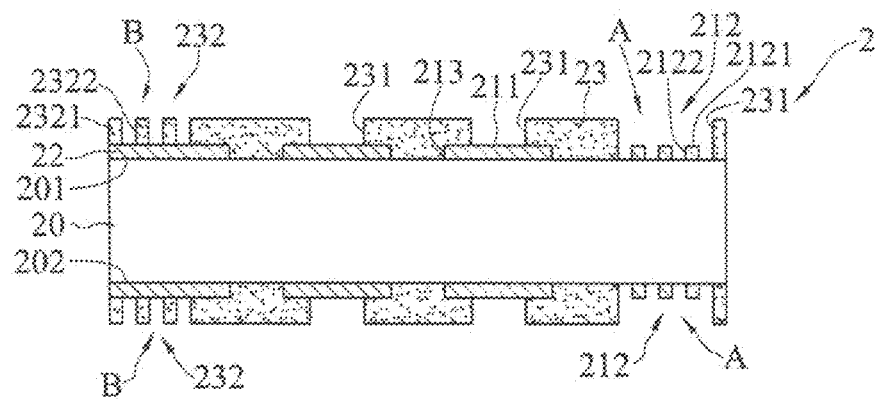
FIG.2C
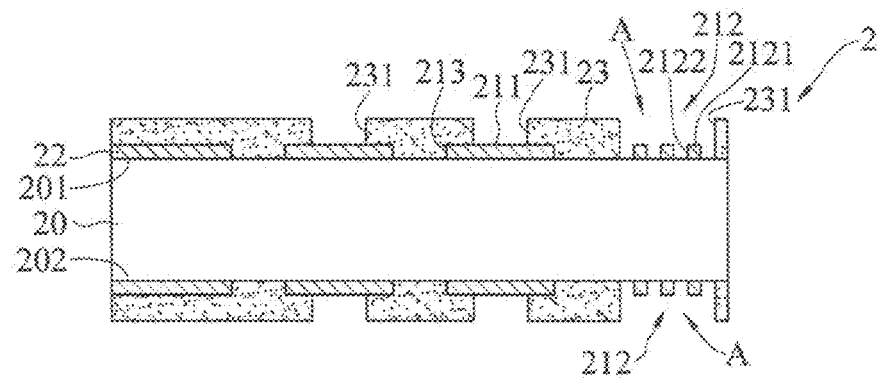
FIG.2C'
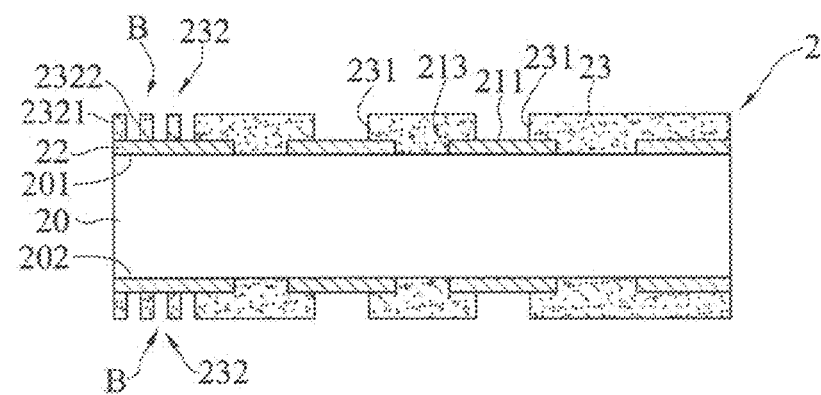
FIG.2C"

SUBSTRATE STRUCTURE AND METHOD OF MANUFACTURING THE SAME

BACKGROUND OF THE INVENTION

1. Field of the Invention

The present invention relates to substrate structures, and, more particularly, to a substrate structure and a simplified method of manufacturing the same.

2. Description of Related Art

As the technology continues to advance, industrial and commercial developments are growing rapidly, leading to convenience orientated global economics. Barcode technology is therefore developed to enhance efficiency in organizing tasks and information.

A barcode is an optical machine-readable representation of data relating to the object to which it is attached, such as catalog number, company number or examination number. Up to date, this barcode technology has been widely applied in commercial industries and in daily life. As the demand of accommodating data is increasing everyday, the barcode technology has been developed from one dimensional bar code (such as JAN13) to two dimensional barcode (such as Matrix code, PDF417). The size of the barcode is also decreasing.

In general, a barcode is often tagged on an appropriate place of the package or surface of the product. A common form of a barcode label is an image having alternating black-white strips. After illuminating the barcode by infrared, due to the properties in which black color tends to absorb light while white color reflects the light, information of the product can be recognized through converting the light waves into electronic pulses and then to obtain the hidden information behind the barcode. Accordingly, clarity of the barcode is a very important aspect in research to correctly distinguish the barcodes to obtain the information.

FIGS. 1A to 1D are cross-sectional views illustrating a method of manufacturing a 2D barcode on a conventional substrate.

As shown in FIG. 1A, a board 10 has a first surface 101 and an opposing second surface 102, and a metallic layer 11 is formed on the first surface 101 and second surface 102.

As shown in FIG. 1B, a patterning process is performed to etch the metallic layer 11, so as to form a patterned metallic layer 12 having a plurality of holes 121, and a portion of the first surface 101 and a portion of the second surface 102 are exposed from the holes 121.

As shown in FIG. 1C, a protective layer 13 having a plurality of holes 131 is formed on the portions of the first surface 101 and the second surface 102 that are exposed from the holes 121. A portion of the patterned metallic layer 12 is exposed from the holes 131.

As shown in FIG. 1D, a laser process is performed on the protective layer 13 to form a protective pattern 130, which forms the 2D image. Alternatively, as shown in FIG. 1D', inkjet is used to form an applying layer 14 on the protective layer 13, so as to form another protective pattern 130' for forming the 2D barcode image.

However, the 2D barcode image is formed on the protective layer 13 in the aforementioned method of manufacture of the 2D barcode on the substrate by laser or inkjet. This increases the cost of the equipment and human resources, and also has the problem of prolonged manufacture process. Moreover, the conventional 2D barcode image is displayed in grey scale, resulting in a decrease in clarity of the displayed barcode image, undesirably making it difficult to be recognized.

Therefore, there is an urgent need for solving the prior art problems.

SUMMARY OF THE INVENTION

According to the foregoing drawbacks, the present invention provides a method of manufacturing a substrate structure, comprising: providing a carrier board having a first surface; and forming a circuit layer and metallic lines on the first surface.

The present invention further comprises a method of manufacturing a substrate structure, comprising: providing a carrier board having a first surface; forming a circuit layer and an unpatterned metallic layer on the first surface; and forming an insulative protective layer on the first surface, the circuit layer, and the unpatterned metallic layer, wherein the insulative protective layer has insulative protective lines and a plurality of holes, the unpatterned metallic layer is exposed from the insulative protective lines, and the circuit layer is exposed from the holes.

The present invention further provides a substrate structure, comprising: a carrier board having a first and a second opposing surface; and a circuit layer and metallic lines formed on the first surface.

The present invention further provides a substrate structure, comprising: a carrier board having a first surface; a circuit layer and an unpatterned metallic layer formed on the first surface; and a protective insulative layer formed on the first surface, the circuit layer and the unpatterned metallic layer, wherein the insulative protective layer has insulative protective lines and a plurality of holes, the unpatterned metallic layer is exposed from the insulative protective lines, and the circuit layer is exposed from the holes.

The substrate structure and the method of manufacturing the same according to the present invention are characterized by forming a barcode at the same time when the substrate is formed by a patterning process, so as to replace the laser process to form the barcode after the substrate is completely, thereby simplifying the manufacturing processes, without the need of preparing extra laser equipment and human resources, and the overall costs are reduced as a result.

In comparison with the conventional grey scale barcode made by laser, the color difference between the protective insulative layer and other layers provided by the present invention allows the 2D codes to be more easily recognized.

BRIEF DESCRIPTION OF DRAWINGS

The present invention can be more fully understood by reading the following detailed description of the preferred embodiments, with reference made to the accompanying drawings, wherein:

FIGS. 2A to 2C" are cross-sectional views illustrating a method of manufacturing a substrate structure according to the present invention; wherein FIGS. 2A to 2B illustrate a first half portion of a method of manufacturing the substrate of a first preferred embodiment according to the preset invention, and FIGS. 2A' to 2B' illustrate a first half portion of the method of manufacturing the substrate of a second preferred embodiment according to the preset invention. FIGS. 2C' and 2C" are different embodiments of FIG. 2C;

DETAILED DESCRIPTION OF PREFERRED EMBODIMENTS

The present invention is described in the following with specific embodiments, so that one skilled in the pertinent art can easily understand other advantages and effects of the present invention from the disclosure of the present invention.

It should be noted that all the drawings are not intended to limit the present invention. Various modification and variations can be made without departing from the spirit of the present invention. Further, terms, such as "first", "second", "third", "fourth" and "one" etc., are merely for illustrative purpose and should not be construed to limit the scope of the pre FIGS. 2A to 2C" are cross-sectional views of a manufacturing method of a substrate structure of the present invention; wherein FIGS. 2A to 2B illustrate the first half part of the manufacturing process of the substrate of the first preferred embodiment of the preset invention while FIGS. 2A' to 2B' illustrate the first half part of the manufacturing process of the substrate of the second preferred embodiment of the preset invention.

Figure 1A:
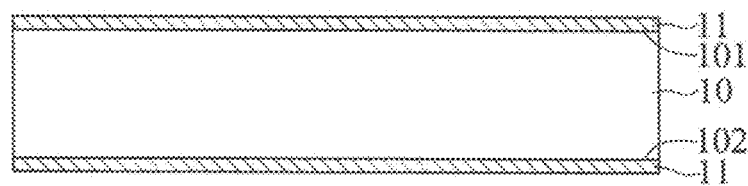
FIGS. 1A to 1D are cross-sectional views illustrating a method of manufacturing a conventional substrate, wherein FIG. 1D' is another method of FIG. 1D.
Figure 1B:
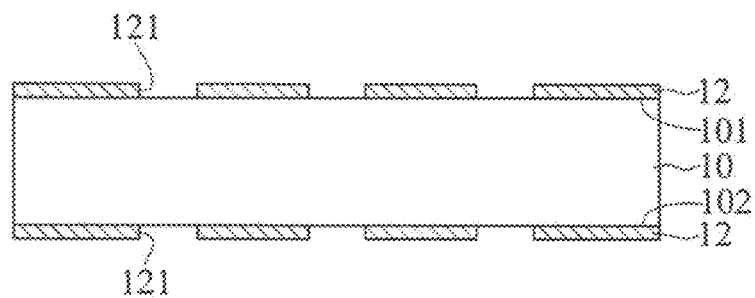
Figure 1C:
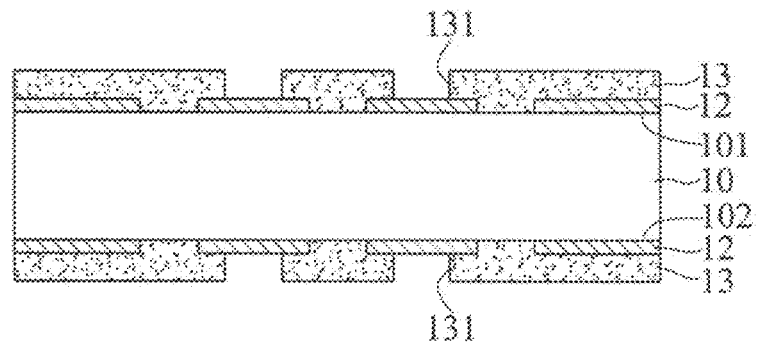
Figure 1D:
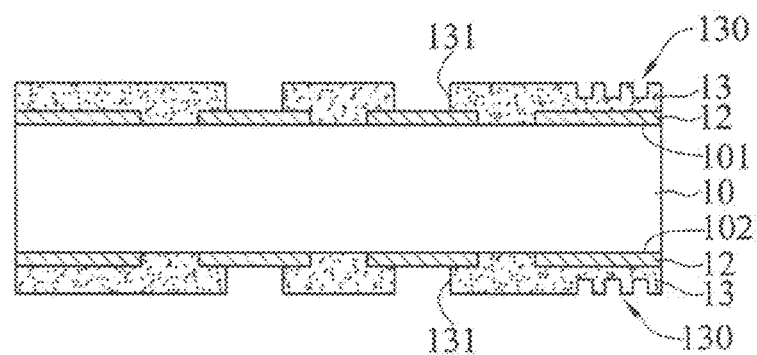
Figure 1D:
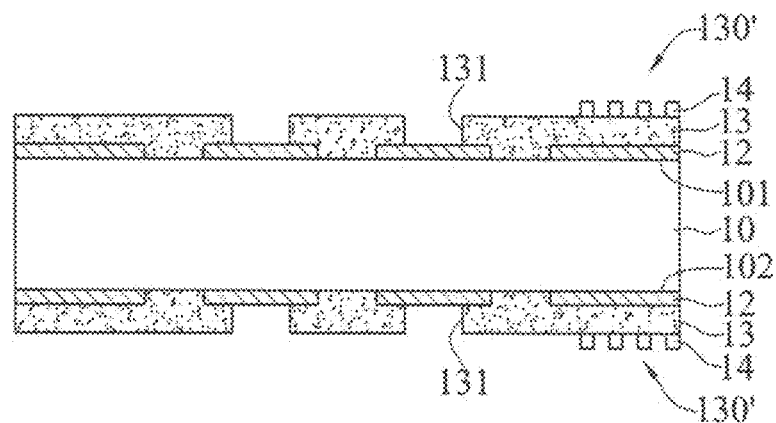
Figure 2A:
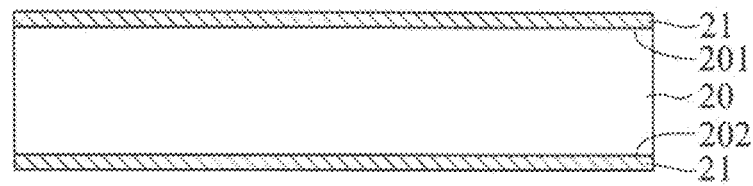

In a first embodiment, as shown in FIG. 2A, a carrier board 20 having a first surface 201 and a second surface 202 is prepared, and a metallic layer 12 formed on the first surface 201 and the second surface 202.

Figure 2B:
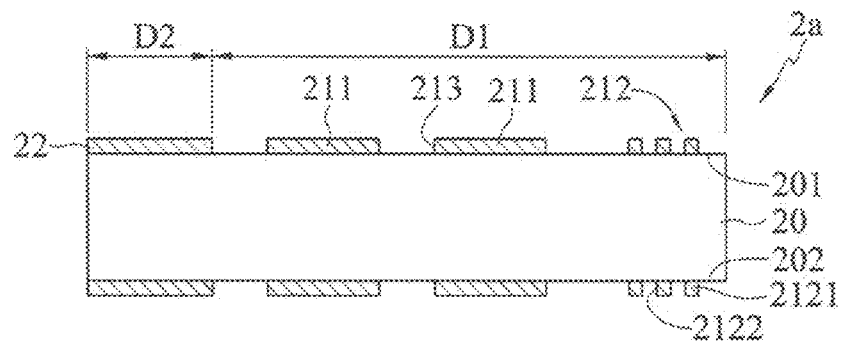
Figure 2A:
Figure 2B:
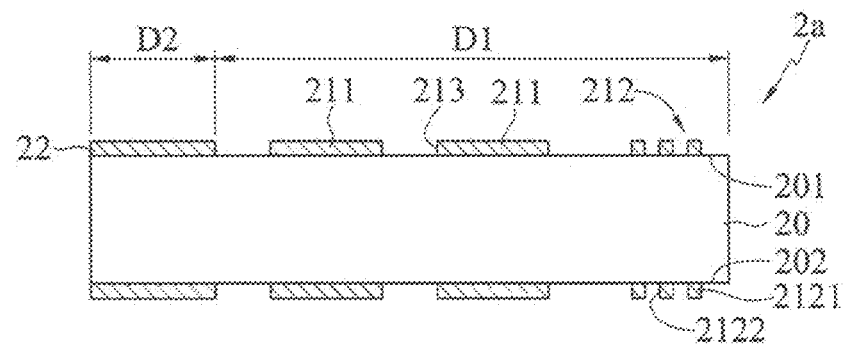

As shown in FIG. 2B, a patterning process is performed to etch the metallic layer 21, allowing the metallic layer 21 to be defined in a pattering region D1 and a non-pattering region D2, and a circuit layer 211, the metallic lines 212 and a plurality of first holes 213 are formed in the pattering region D1, so as to form a first stage substrate 2a for the subsequent processes.

In a second embodiment, as shown in FIG. 2A', a carrier board 20 having a first surface 201 and a second surface 202 is formed.

As shown in FIG. 2B', a patterning process is performed on the first surface 201 and the second surface 202 of the carrier board 20 to deposit a metallic material, allowing the circuit layer 211, the metallic lines 212 and a plurality of the first holes 213 to be formed in the patterning region D1 and the unpatterned metallic layer 22 is formed in the unpatterned region D2 to form the first stage substrate 2a for the subsequent processes.

In an embodiment, the depositing process is achieved by at least one of, but is not limited to the following processes: electroplating or chemical vapor deposition (CVD) or physical vapor deposition (PVD), such as evaporation deposition, ion plating and sputtering deposition.

In an embodiment, the metallic layer is made of one of the materials including copper, iron or a combination thereof, the selection of which depends on practical requirements but is not limited to the aforesaid materials.

In an embodiment, the metallic lines 212 is formed with at least one second hole 2122, and the metallic lines 212 can be formed by at least one metallic metal pillar 2121, and a portion of the first surface 201 and a portion of the second surface 202 are exposed from the first holes 213 and the second holes 2122.

FIG. 2C is a cross-sectional view of a first stage substrate 2a after the first stage process disclosed in first and second embodiments, preparing for subsequent processes.

As shown in FIG. 2C, an insulative protective layer 23 is formed on the first surface 201, the second surface 202, the circuit layer 211, the metallic lines 212 and the unpatterned metallic layer 22. The protective insulative layer 23 has a plurality of third holes 231 and protective insulative lines 232, and is exposed from the first surface 201 of the second holes 2122. The circuit layer 211 and the metallic lines 212 are exposed from the third holes 231, and the protective insulative lines 232 have at least one fourth holes 2322. The insulative protective lines 232 are formed by at least one insulative pillar 2321, allowing the unpatterned metallic layer 22 to be exposed from the fourth holes 2322.

Figure 3:
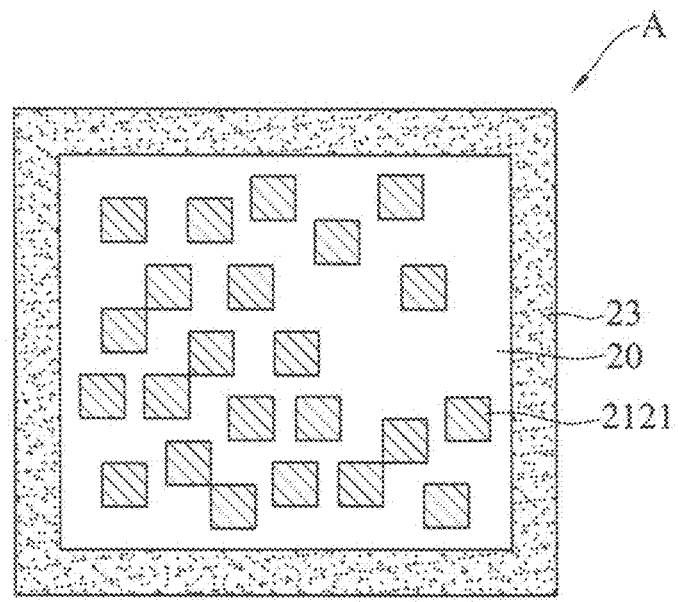
FIG. 3 is a top view of the 2D codes of the first embodiment according to the present invention.
Figure 4:
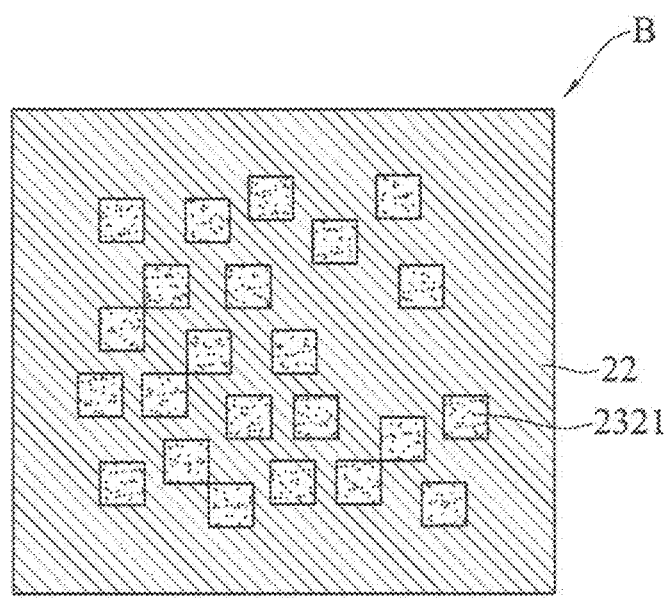
FIG. 4 is a top view of the 2D codes of another embodiment according to the present invention.

Accordingly, 2D codes A are formed by the metallic lines 212 and the first surface 201 (referring also to FIG. 3 which is a top view of 2D codes A), and 2D codes B are formed at the same by the unpatterned 22 being exposed from the fourth holes 2322 and the insulative protective lines 232 (referring to FIG. 4 which is the top view of the 2D codes B), so as to form the substrate structure having 2D codes.

In the present embodiment, the insulative protective layer 23 can be a solder mask layer, and a color difference is established between the insulative layer 23 and the first surface 201, the second surface 202, the circuit layer 211, the metallic lines 212 and the unpatterned metallic layer 22. The 2D codes A and B include material number, wholesale number, board number and defect position, etc.

It should be noted that the 2D codes A and B can be both formed on the substrate structure 2, or one of the 2D codes A and B is selectively formed on the substrate structure 2 (as shown in FIGS. 2C' and 2C"). Additional it is not necessary to form the 2D codes A and B at the same time, and also the 2D codes A and B are not limited to the periphery of the substrate structure 2, but on the other hand can be formed at any appropriate places on the substrate structure 2.

In conclusion, the substrate structure and the method of manufacture of the present invention is characterized by forming a barcode at the same time when the substrate is formed by a patterning process, so as to replace the laser process to form the barcode after the substrate is completely, thereby simplifying the manufacturing processes, without the need of preparing extra laser equipment and human resources, and the overall costs are reduced as a result.

Besides, through the protective insulative layer and obvious color difference between the layers, the present invention can greatly enhance the recognizability of 2D codes.

The present invention has been described using exemplary preferred embodiments. However, it is to be understood that the scope of the present invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method of manufacturing a substrate structure, comprising;
   providing a carrier board having a first surface;
   forming a circuit layer, an unpatterned metallic layer and metallic lines on the first surface; and
   forming an insulative protective layer on the first surface, the circuit layer, the unpatterned metallic layer and the metallic lines,
   wherein the insulative protective layer has insulative protective lines and a plurality of holes, the unpatterned metallic layer is exposed from the insulative protective lines, and the metallic lines and the circuit layer are exposed from the holes, and
   wherein the unpatterned metallic layer and the insulative protective lines form 2D codes, and the metallic lines and the carrier board form another 2D codes.

2. The method of claim 1, wherein the insulative protective layer is a solder mask layer.

3. The method of claim 1, wherein the carrier board has a second surface opposing the first surface and a metallic layer formed on the first surface and the second surface, and the circuit layer and metallic lines are formed by patterning the metallic layer.

4. A method of manufacturing a substrate structure, comprising;
 providing a carrier board having a first surface;
 forming a circuit layer and an unpatterned metallic layer on the first surface; and
 forming an insulative protective layer on the first surface, the circuit layer, and the unpatterned metallic layer, wherein the insulative protective layer has insulative protective lines and a plurality of holes, the unpatterned metallic layer is exposed from the insulative protective lines, the circuit layer is exposed from the holes, and the unpatterned metallic layer and the insulative protective lines form 2D codes.

5. The method of claim 4, wherein the insulative protective layer is a solder mask layer.

6. A substrate structure, comprising;
 a carrier board having a first surface and a second surface opposing the first surface;
 a circuit layer, an unpatterned metallic layer and metallic lines formed on the first surface; and
 an insulative protective layer formed on the first surface, the circuit layer, the unpatterned metallic layer and the metallic lines,
 wherein the insulative protective layer has insulative protective lines and a plurality of holes, the unpatterned metallic layer is exposed from the insulative protective lines, and the metallic lines and the circuit layer are exposed from the holes, and
 wherein the unpatterned metallic layer and the insulative protective lines form 2D codes, and the metallic lines and the carrier board form another 2D codes.

7. The substrate structure of claim 6, wherein the insulative protective layer is a solder mask layer.

8. A substrate structure, comprising:
 a carrier board having a first surface;
 a circuit layer and unpatterned metallic layer formed on the first surface; and
 an insulative protective layer formed on the first surface, the circuit layer and the unpatterned metallic layer, wherein the insulative protective layer has insulative protective lines and a plurality of holes, the unpatterned metallic layer is exposed from the insulative protective lines, the circuit layer is exposed from the holes, and the unpatterned metallic layer and the insulative protective lines form 2D codes.

9. The substrate structure of claim 8, wherein the insulative protective layer is a solder mask layer.

* * * * *